United States Patent
Gibson et al.

[11] Patent Number: 6,049,169
[45] Date of Patent: Apr. 11, 2000

[54] ELECTRIC LAMP HAVING OPTICAL INTERFERENCE FILTER OF ALTERNATING LAYERS OF $SIO_2$ AND $NB_2O_5$—$TA_2O_5$

[75] Inventors: Ray G. Gibson, Bath, N.Y.; Eduardus Johannes Cottaar, Heerlen, Netherlands; Wolfgang Doetter, Aachen, Germany

[73] Assignee: Philips Electronics North America Corp., New York, N.Y.

[21] Appl. No.: 09/057,101

[22] Filed: Apr. 8, 1998

[51] Int. Cl.[7] .................................. H01J 17/16
[52] U.S. Cl. .................. 313/635; 313/493; 313/634; 313/112
[58] Field of Search .................. 313/493, 634, 313/635, 112

[56] References Cited

U.S. PATENT DOCUMENTS

| | | | |
|---|---|---|---|
| 4,663,557 | 5/1987 | Martin, Jr. et al. | 313/112 |
| 4,734,614 | 3/1988 | Kuus | 313/112 |
| 4,904,636 | 2/1990 | Brock et al. | 428/426 |
| 5,138,219 | 8/1992 | Krisl et al. | 313/112 |
| 5,493,442 | 2/1996 | Bucholz et al. | 359/359 |
| 5,552,671 | 9/1996 | Parham et al. | 313/635 |
| 5,646,472 | 7/1997 | Horikoshi | 313/112 |

FOREIGN PATENT DOCUMENTS

| | | | |
|---|---|---|---|
| 0516436 | 5/1992 | European Pat. Off. | H01J 37/34 |

*Primary Examiner*—Vip Patel
*Attorney, Agent, or Firm*—F. Brice Faller

[57] ABSTRACT

Thin film interference filter consists of alternating first and second layers, the first layers being silica, the second layers being a mixture of tantala and niobia. The filter may be used on a high temperature lamp in an inert atmosphere if the niobia in the mixture is less than 40% by weight. For higher percentages a partial pressure of oxygen has been found to prevent blackening of the layers.

13 Claims, 3 Drawing Sheets

ELECTRIC LAMP HAVING OPTICAL INTERFERENCE FILTER OF ALTERNATING LAYERS OF $SIO_2$ AND $NB_2O_5$— $TA_2O_5$

BACKGROUND OF THE INVENTION

This invention relates generally to halogen lamps, and more particularly to a lamp vessel having a multi-layer optical interference coating for reflecting infrared radiation. More particularly, the coating includes alternating first and second layers, wherein the first layer has a relatively low refractive index, such as silica, and the second layer has a relatively high refractive index, such as tantala or niobia.

Interference filters having alternating layers of two or more materials of different refractive index are well known. Such coating films are used to transmit some wavelengths of radiation and to reflect other wavelengths. Such filters can be used to improve the illumination efficiency or efficacy of incandescent lamps or discharge lamps by reflecting infrared radiation emitted by an electric element, which may be a filament or a gas discharge, back to the element while transmitting the visible light. This lowers the amount of electrical energy required to maintain the operating temperature of the element.

Optical interference coatings or filters used for applications where the filter will be exposed to high temperatures, in excess of 500° C., have been made of alternating layers of refractory metal oxides such as silica ($SiO_2$) and one of tantala ($Ta_2O_5$) and niobia ($Nb_2O_5$). The silica is the low refractive index material (n=1.46) and the tantala (n=2.13) or niobia (n=2.35) is the high refractive index material. In such lamp applications, the filters are applied on the outside surface of the vitreous lamp envelope containing the filament or arc within and often reach operating temperatures as high as 900° C. These interference filters are generally applied using chemical vapor deposition (CVD) and low pressure chemical vapor deposition (LPCVD) processes or reactive sputtering.

U.S. Pat. No. 4,663,557 to Martin et al. discloses an optical interference coating having alternating layers of $SiO_2$ and $Ta_2O_5$ which is suitable for use in high temperature environments. A problem with $Ta_2O_5$, however, is that it crystallizes to a polycrystalline form at temperatures in excess of 800° C., which causes the filter to scatter transmitted light and the reflected radiation.

U.S. Pat. No. 4,734,614 to Kuus describes a halogen lamp with an interference filter of $SiO_2$ and $Nb_2O_5$, the purpose of which is to overcome scatter and high temperature problems found with coatings of $SiO_2/Ta_2O_5$. These coatings have been used successfully on 60 watt hard glass halogen burners that operate under 500° C. and are placed in reflectors having lenses that are not hermetically sealed. However, 100 watt burners operate at high temperatures and require quartz glass lamp vessels in a hermetically sealed inert gas environment in order to protect the pinch area from oxidation.

Niobia coatings have the disadvantage that such coatings blacken when operated in an inert environment, such as in lamps where the reflector is hermetically sealed with a flame sealing process. This absorbing characteristic is apparently due to reduction of the niobia so that it is substoichiometric and therefore opaque. Tantala exhibits this problem to a much smaller degree, but tantalum sputtering targets are twice as expensive as niobium. Furthermore, the index of refraction for niobia is higher than for tantala (2.35 vs. 2.14), which can result in a thinner coating or higher efficiency.

In view of the foregoing it would be desirable to attain the advantages of tantala, e.g. limited tendency to become absorptive in an inert environment, and niobia, e.g. no high temperature scatter, lower cost, and high refractive index.

SUMMARY OF THE INVENTION

According to the invention, a lamp vessel is provided with an interference filter wherein the second or high refractive index layers are a mixture of tantala and niobia. Where the niobia is less than 38% by weight in the mixture it has been found that the layers do not become absorptive in an inert environment. Where the niobia exceeds 38% by weight in the second layers, it has been found that a partial oxygen pressure will prevent blackening. For a lamp life of 3000 hours, for a 100 watt lamp without blackening, the minimum oxygen pressure should be 0.10 torr at 38% niobia, and this minimum should increase according to a straight line semi-log curve to 9.8 torr at 100% niobia.

The mixture according to the invention obtains the advantages of niobia in a 100 watt lamp in an inert or substantially inert environment, which is necessary to prevent oxidation of the molybdenum foil in the seals. If the seals fail, the filament oxidizes rapidly and the lamp fails.

DETAILED DESCRIPTION OF THE PREFERRED EMBODIMENT

Figure 1:
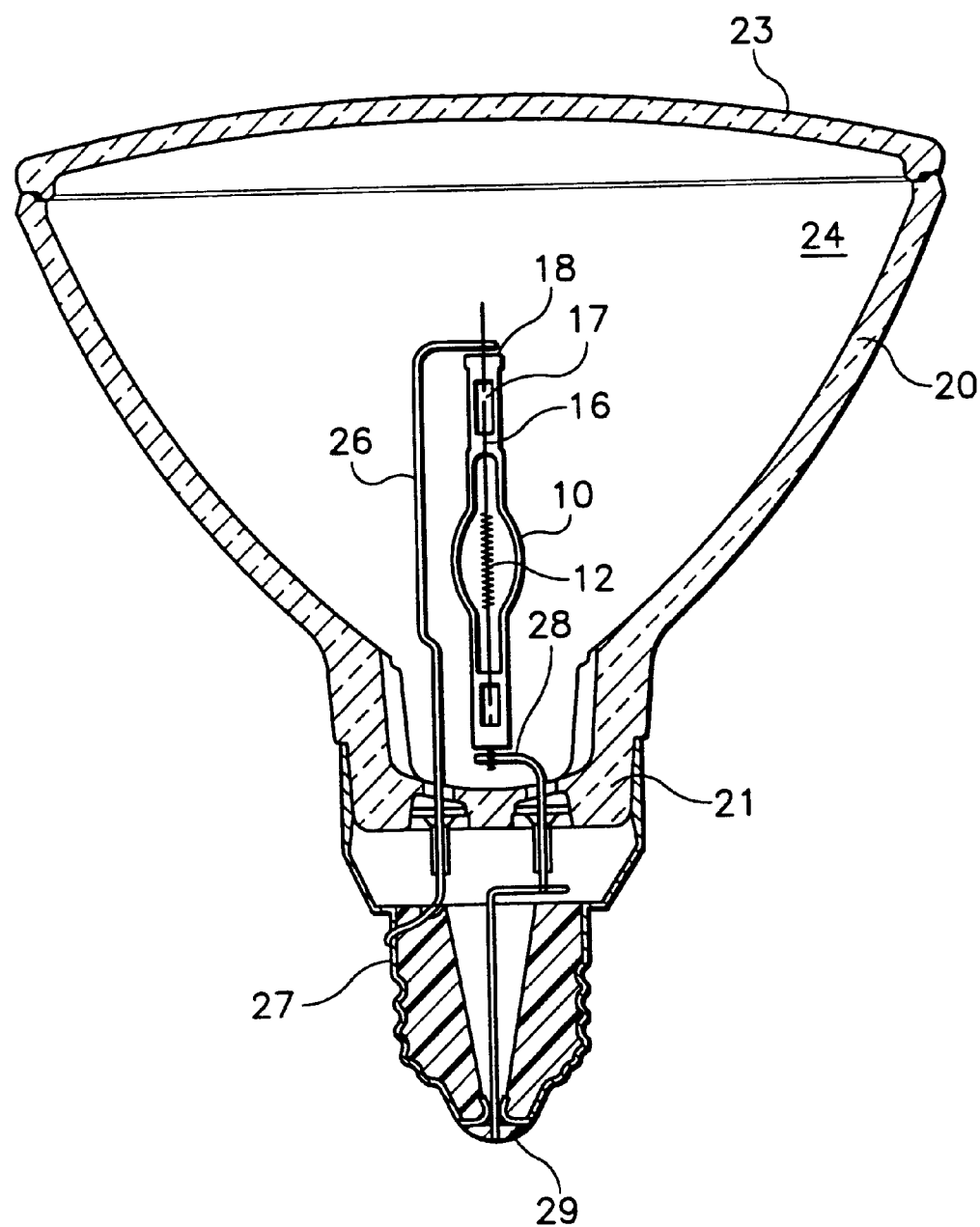
FIG. 1 is a section view of a lamp envelope having therein a lamp vessel with an interference filter according to the invention.

FIG. 1 depicts a known lamp for which the interference filter according to the invention (not visible) would be useful. The halogen burner includes a lamp vessel 10 having therein a tungsten filament 12 connected at both ends to current supply conductors 14 which each comprise an inner lead 16 connected to the element 12, a molybdenum foil 17 in the pinch sealed portion of the lamp vessel, and an outer lead 18. The lamp vessel 10 has an elliptically shaped mid-portion which is provided with an interference filter according to the invention on the outside, thereby reflecting infrared radiation back toward the filament 12 to improve thermal efficiency and reduce the power necessary for incandescence. A lamp of this type is described in greater detail in U.S. Pat. No. 5,138,219.

The lamp depicted in FIG. 1 is a halogen incandescent lamp having a filling of inert gas and hydrobromide. Such lamps are well known and may also have an elongate cylindrical lamp vessel as disclosed in U.S. Pat. Nos. 4,734,614 and 5,138,219. The principles of infrared reflection may also be applicable for maintaining the temperature of a discharge gas as well as a filament. The term "electrical element," as used herein, will thus be understood to include other light sources in lamps, such as the arc in a high pressure mercury discharge lamp which contains metal halide in the gas filling. The layers in a coating may also be dimensioned and arranged so that the coating absorbs UV radiation as disclosed in U.S. Pat. Nos. 5,552,671 and 5,646,742.

The outer envelope 20 is shaped as a parabolic reflector having an integral base 21 which receives the conductive mounting legs 26, 28 therethrough. The lead 26 is connected to screw base 27, while the lead 28 is connected to the insulated central contact 29. The glass or plastic lens or cover 23 may be attached by adhesive when a hermetic seal is not necessary. However, when it is desired to maintain an inert gas environment in the fill space 24, the cover 23 would typically be glass which is flame-sealed to the envelope 20.

While U.S. Pat. No. 5,138,129 discloses a lamp assembly substantially as shown in FIG. 1, it is only suitable for 60 watt tungsten halogen lamp unless an inert environment is used. For a 100 watt lamp, which operates at temperatures which may exceed 800° C., it is necessary to provide an inert gas filling to prevent oxidation of conductors 14. The coating according to the invention is suitable for such an environment, because it does not undergo reduction to a substoichiometric state to the same degree as pure niobia, which causes absorption (blackening). Further it does not exhibit scattering to the same degree as pure tantala when exposed to high temperatures.

The coating which forms the interference filter according to the invention is preferably a 47 layer coating of the type disclosed in U.S. Pat. No. 5,138,129, which is incorporated herein by reference. The chief difference is that the coating according to the invention utilizes a mixture of $Ta_2O_5$ and $Nb_2O_5$ as the high refractive index material. Additionally, as will be described, the coating according to the invention is formed by DC magnetron sputtering rather than LPCVD. Sputtered coatings generally result in reduced stress levels, as compared to LPCVD.

Figure 2:
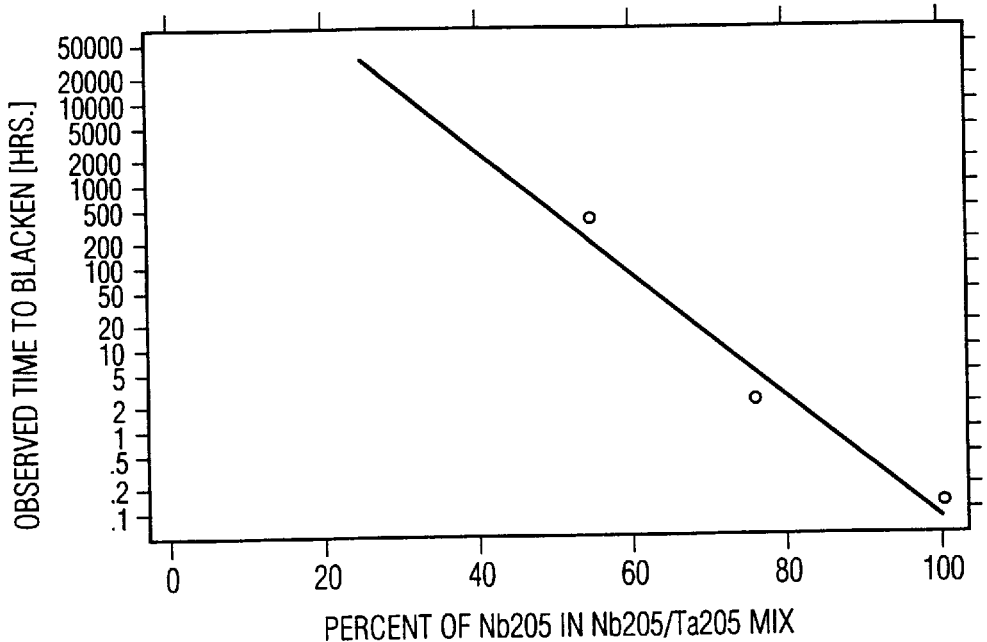
FIG. 2 is a plot of observed time to blacken vs. percent of $Nb_2O_5$ in mixture.

FIG. 2 is a plot, approximated by a straight line, of observed time for a coating in an inert atmosphere to blacken versus the percent of niobia in the mixture forming the second or high refractive index layers. All points are averages of three or four lamps. The line represents a linear regression of the three points with a slope of −17.167. For a mixture having 43% niobia, no blackening was observed at 2943 hours of operation of a 100 watt lamp in an environment of substantially pure nitrogen at a fill pressure of 600 torr. By this time, the coils in the test lamp failed while the coating remained clear. At 25% niobia no blackening was observed or expected. At 55% niobia, on the other hand, blackening was observed at 248 hours. At 75% and 100% niobia, blackening was observed at 2.25 hours and 0.1 hours, respectively. The time in hours for a mixed coating on a 47-layer halogen burner to blacken can be approximated by the equation $t=2\times10^{+6}e^{-17.2f}$, where f is the fraction of $Nb_2O_5$ in the mix.

While blackening of a 100 watt lamp is expected at about 3000 hours with 43% niobia in the mixture, it has been found that higher percentages can be used when some oxygen is present in the inert gas. This partial oxygen pressure apparently prevents reduction of the $Nb_2O_5$ to a substoichiometric state.

Figure 3:
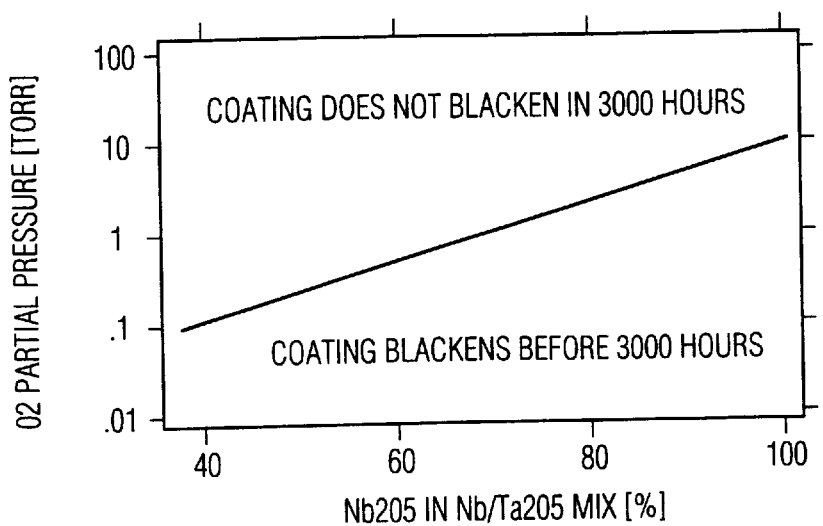
FIG. 3 is a semi-log plot of minimum oxygen pressure vs. percent of $Nb_2O_5$ in mixture for clear coating.

FIG. 3 is a semi-log plot, approximated by a straight line, of the oxygen pressure versus the percent of $Nb_2O_5$ in the mixture, to prevent blackening until a 100 watt lamp has operated until at least 3000 hours. The line is drawn between two end points, 0.1 torr at 38% and 10 torr at 100%. The equation for the line is $P_{o2}=6\times10^{-3}e^{7.4f}$.

Figure 4:
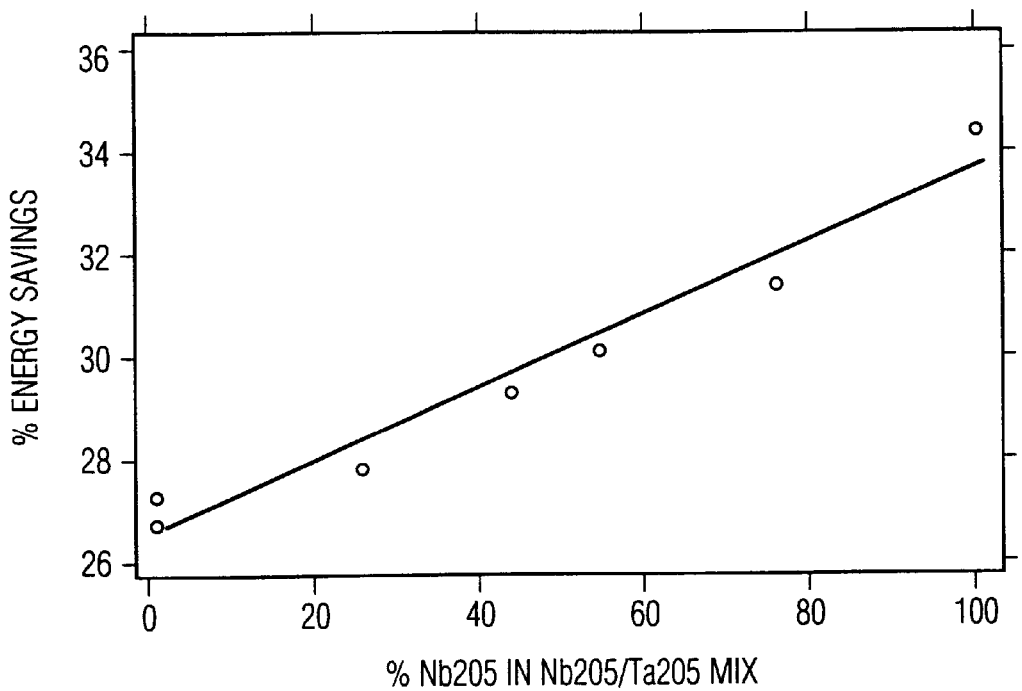
FIG. 4 is a plot of energy savings vs. percent of $Nb_2O_5$ in mixture.

FIG. 4 is a plot of energy savings vs. percent of niobia in the mixture on 100 watt quartz burners. Here the term "energy savings" refers to the reduction in wattage for a coated versus an uncoated burner at the same filament temperature; temperature can be measured by resistance. For example, if 125 watts are required to achieve 144 ohms in an uncoated burner, and 100 watts are required to achieve 144 ohms in the coated burner, then the energy savings is 20%. This can be expressed by a simple equation wherein energy savings=1−(coated power)/(uncoated power).

The layers of the interference filter are formed by a microwave enhanced DC-magnetron sputtering process as disclosed in EP 0 516 436. This is also known as the MicroDyn sputtering system from Deposition Sciences, Inc. of Santa Rosa, Calif. This European publication discloses using two targets, for example at Si and Nb, to deposit $SiO_2$ and $Nb_2O_5$ by alternatively energizing the targets in an atmosphere containing oxygen as the reactive gas; the working gas is typically argon. The system is adapted to produce the coating according to the invention by running four targets with independent control. The first layers are formed by running the two silicon targets, while the second layers are formed by running the tantalum target and the niobium target. The relative powers of the targets can be adjusted to achieve any ratio of the two oxides and likewise any refractive index between 2.14 and 2.35. The total thickness of the mixed material is controlled by the total power (sum of the powers for the respective targets).

Note that the mixed material may not consist of discrete molecules of the respective oxides, but may be an oxide of the Ta/Nb matrix. In any event the material behaves as if it were a simple mixture. For example, the transmission curves (transmission vs. wavelength) are well known for the interference filters having layers of the respective oxides, and the curve for the mixed oxide appears as a superposition of the individual curves. Transmission of visible wavelengths between 400 and 800 nm is nearly 100% for a 47 layer coating, while about 80% of the longer infrared wavelengths are reflected. See in particular the transmission curve for an $SiO_2/Ta_2O_5$ coating disclosed in U.S. Pat. No. 5,138,195; this is closely approximated by the present invention.

The foregoing is exemplary and not intended to limit the scope of the claims which follow.

What is claimed is:

1. An electric lamp assembly comprising
   a lamp vessel sealed in a vacuum tight manner,
   an electric element arranged in the lamp vessel and connected to current supply conductors extending through the lamp vessel,
   a hermetically sealed outer envelope in which said lamp vessel is located, said outer envelope having a filling consisting essentially of inert gas surrounding said lamp vessel, and
   an interference filter on the lamp vessel, said interference filter comprising alternating first and second layers, said first layers consisting essentially of $SiO_2$, and second layers consisting essentially of a mixture of $Nb_2O_5$ and $Ta_2O_5$, said mixture having a least 20% $Nb_2O_5$ by weight and at most 40% $Nb_2O_5$ by weight.

2. An electric lamp assembly as in claim 1 wherein said straight line is represented by $P_{o2}=6\times10^{-3}e^{7.4f}$, where $P_{o2}$ is the oxygen pressure in torr, and f is the fraction of $Nb_2O_5$ in the mixture.

3. An electric lamp assembly as in claim 1 wherein said interference filter consists of said first and second layers.

4. An electric lamp assembly as in claim 1 wherein said lamp vessel is quartz.

5. An electric lamp assembly as in claim 1 wherein said lamp vessel is hardglass.

6. An electric lamp assembly as in claim 1 wherein said first and second layers are produced by a sputtering process.

7. An electric lamp as in claim 1 wherein said interference filter reflects infrared radiation and transmits visible radiation.

8. An electric lamp assembly comprising a lamp vessel sealed in a vacuum tight manner, an electric element arranged in the lamp vessel and connected to current supply conductors extending through the lamp vessel, a hermetically sealed outer envelope in which said lamp vessel is located, said outer envelope having a filling with a partial oxygen pressure which increases with percent of $Nb_2O_5$ in said mixture, said minimum being represented by a straight line semi-log plot of oxygen pressure vs. percent of $Nb_2O_5$ in said mixture, and an interference filter on the lamp vessel, said interference filter comprising alternating first and second layers, said first layers consisting essentially of $SiO_2$, and second layers consisting essentially of a mixture of $Nb_2O_5$ and $Ta_2O_5$, said mixture having a least 38% $Nb_2O_5$ by weight.

9. An electric lamp assembly as in claim 8 wherein said interference filter consists of said first and second layers.

10. An electric lamp assembly as in claim 8 wherein said lamp vessel is quartz.

11. An electric lamp assembly as in claim 8 wherein said lamp vessel is hardglass.

12. An electric lamp assembly as in claim 8 wherein said first and second layers are produced by a sputtering process.

13. An electric lamp as in claim 8 wherein said interference filter reflects infrared radiation and transmits visible radiation.

* * * * *